US011473260B2

(12) United States Patent
Yin et al.

(10) Patent No.: US 11,473,260 B2
(45) Date of Patent: Oct. 18, 2022

(54) EFFECTIVE STRESS CELL FOR DIRECT MEASUREMENT OF EFFECTIVE STRESS IN SATURATED SOIL

(71) Applicant: THE HONG KONG POLYTECHNIC UNIVERSITY, Hong Kong (CN)

(72) Inventors: Jian-Hua Yin, Hong Kong (CN); Jie-Qiong Qin, Hong Kong (CN); Wei-Qiang Feng, Hong Kong (CN)

(73) Assignee: THE HONG KONG POLYTECHNIC UNIVERSITY, Hong Kong (CN)

( * ) Notice: Subject to any disclaimer, the term of this patent is extended or adjusted under 35 U.S.C. 154(b) by 359 days.

(21) Appl. No.: 16/689,163

(22) Filed: Nov. 20, 2019

(65) Prior Publication Data

US 2020/0181864 A1 Jun. 11, 2020

Related U.S. Application Data

(60) Provisional application No. 62/777,404, filed on Dec. 10, 2018.

(51) Int. Cl.
*G01L 9/00* (2006.01)
*G01L 1/24* (2006.01)
(Continued)

(52) U.S. Cl.
CPC ............ *E02D 1/027* (2013.01); *G01L 9/0041* (2013.01)

(58) Field of Classification Search
CPC ..... G01L 1/24; G01L 9/00; G01L 1/02; G01L 1/22; G01L 25/00; G01L 5/00;
(Continued)

(56) References Cited

U.S. PATENT DOCUMENTS 4,524,626 A * 6/1985 Pabst .................... G01L 9/0051
73/84
4,752,402 A * 6/1988 Gray ...................... B01D 35/00
405/36

FOREIGN PATENT DOCUMENTS

CN 101413836 A 4/2009
CN 102519630 A 6/2012
(Continued)

OTHER PUBLICATIONS

Clayton, C. R. I., and Bica, A. V. D. 1993. The design of diaphragm-type boundary total stress cells. Géotechnique, 43 (4): 523-535.
(Continued)

*Primary Examiner* — Brandi N Hopkins
(74) *Attorney, Agent, or Firm* — Spruson & Ferguson (Hong Kong) Limited

(57) ABSTRACT

The present disclosure provides an effective stress cell for direct measurement of effective stress in saturated soil. The effective stress cell comprises a sensing diaphragm, a porous diaphragm, a connector and a strain sensor. The porous diaphragm allows pore-water to enter the interior space between the sensing diaphragm and the porous diaphragm to provide complete balance of pore-water pressures in the front and back of the sensing diaphragm. Thus, the effective stress cell can directly and accurately measure the effective stress in saturated soil using only one diaphragm at one location without measuring pore-water pressure.

18 Claims, 15 Drawing Sheets

(51) Int. Cl.
*G01L 25/00* (2006.01)
*E02D 1/02* (2006.01)
(58) Field of Classification Search
CPC ........... G01L 1/12; G01L 9/0051; E02D 1/02; E02D 1/027; E02D 1/022; G01B 11/16; G01N 15/08
See application file for complete search history.

(56) References Cited

FOREIGN PATENT DOCUMENTS

| | | |
|---|---|---|
| CN | 102944342 A | 2/2013 |
| CN | 204228306 U | 3/2015 |

OTHER PUBLICATIONS

Lade, P. V., and De Boer, R. 1997. The concept of effective stress for soil, concrete and rock. Géotechnique, 47(1): 61-78.
Talesnick, M. 2005. Measuring soil contact pressure on a solid boundary and quantifying soil arching. Geotechnical Testing Journal, 28(2): 171-179.
Talesnick, M. 2013. Measuring soil pressure within a soil mass. Canadian Geotechnical Journal, 50(7): 716-722.
Grattan, K. T. V., and Sun, T. 2000. Fiber optic sensor technology: an overview. Sensors and Actuators A: Physical, 82 (1-3): 40-61.
Hill, K. O., Fujii, Y., Johnson, D. C., and Kawasaki, B. S. 1978. Photosensitivity in optical fiber waveguides: Application to reflection filter fabrication. Applied Physics Letters, 32(10): 647-649.
Pei, H. F., Teng, J., Yin, J. H., and Chen, R. 2014. A review of previous studies on the applications of optical fiber sensors in geotechnical health monitoring. Measurement, 58: 207-214.
Yin, J. H., Zhu, H. H., Jin, W., Yeung, A., and Mak, L. M. 2007. Performance evaluation of electrical strain gauges and optical fiber sensors in field soil nail pullout tests. In HKIE Geotechnical Division Annual Seminar, Hong Kong. pp. 249-254.
Correia, R., Li, J., Staines, S., Chehura, E., James, S. W., Kutner, J., Dewhurst, P., Ferreira, P., and Tatam, R. P. 2009. Fibre Bragg grating based effective soil pressure sensor for geotechnical applications. In 20th International Conference on Optical Fibre Sensors, 7503: 75030F.
First Office Action with Search Report of CN2019112578142 issued by the China National Intellectual Property Administration (CNIPA) of the PRC dated Mar. 19, 2021.

* cited by examiner

EFFECTIVE STRESS CELL FOR DIRECT MEASUREMENT OF EFFECTIVE STRESS IN SATURATED SOIL

CROSS-REFERENCE TO RELATED APPLICATIONS

This application claims the benefit of U.S. Provisional Patent Application No. 62/777,404, filed on 10 Dec. 2018, which is incorporated by reference herein in its entirety.

TECHNICAL FIELD

The present disclosure relates to an effective stress cell for directly measuring effective stress in saturated soil and a measurement system for measuring the same.

BACKGROUND

In geotechnical engineering, both deformation and stability are directly related to the effective stresses in soil. Effective stress is an important and fundamental variable for analyzing the deformation and stability of geotechnical structures. Therefore, determination of the effective stress plays a vital role in safety and stability assessments of geotechnical structures. Considering equilibrium of all forces in vertical direction in a cubic element, the equations for calculating the effective stress according to the effective stress principle are shown as follows:

$$\frac{P}{A} = \frac{\sum N'}{A} + u \quad (1a)$$

$$\sigma = \sigma' + u \quad (1b)$$

$$\sigma' = \sigma - u \quad (1c)$$

where P is the total external vertical force on a cubic element, $\sum N'$ are summation of all vertical fractions, A is the cross-section area of the cubic element, and u is the pore-water pressure in voids.

In Eqn. (1b) the total stress is $\sigma = P/A$ and the effective stress $\sigma'$ is defined as:

$$\sigma' = \frac{\sum N'}{A} \quad (2)$$

Here the effective stress $\sigma'$ is defined as the average value of all vertical (normal) fractions of particle contact forces over the cubic element cross-section area. The normal way to determine this effective stress is to measure the pore-water pressure u and the total stress $\sigma$ separately so that the effective stress can be calculated using Eqn. (1c). This conventional method using Eqn. (1c) is an indirect measurement method. Using this method, two separate transducers, one for measuring pore-water pressure and one for measuring the total earth pressure, are required.

This indirect measurement method may cause errors in effective stress calculation since the response of two separate transducers for measuring pore-water pressure and total stress to the applied pressure is not identical. In addition, as two separated transducers are required, the measurement process becomes complicated and the equipment and installation costs are substantially increased.

A need therefore exists for an effective stress measurement device that eliminates or at least diminishes the disadvantages and problems described above.

SUMMARY OF THE INVENTION

The present discloses provides an effective stress cell, which can directly and accurately measure the effective stress in saturated soil using only one diaphragm without measuring pore-water pressure. The effective stress cell has the advantages, e.g., direct measurement, high accuracy, long-term stability, low signal loss, capacity of multiplexing, etc.

Provided herein is an effective stress cell for measuring effective stress in saturated soil comprising: a sensing diaphragm comprising an outer surface and an inner surface, the outer surface for being subjected to total stress from soil particles and pore-water above the sensing diaphragm, the inner surface being opposite to the outer surface; a porous diaphragm preventing soil particles below the porous diaphragm from passing through the porous diaphragm and comprising a plurality of pores for allowing pore-water below the porous diaphragm to pass through the porous diaphragm; a connector connecting the sensing diaphragm and the porous diaphragm in a way that an interior space surrounded by the inner surface of the sensing diaphragm, the porous diaphragm and the connector is formed; and a strain sensor attached to the inner surface for measuring strain change on the sensing diaphragm under deflection of the sensing diaphragm; wherein the plurality of pores allows the pore-water below the porous diaphragm to enter the interior space for filling the interior space with the pore-water to balance pore-water pressures on the outer surface and the inner surface such that the deflection of the sensing diaphragm is only caused by the effective stress such that the effective stress is directly determined by the measured strain change without measuring pore-water pressure in the saturated soil.

In certain embodiments, the effective stress cell is cylindrical and has a diameter between 3 cm and 20 cm and a thickness between 10 mm and 20 mm.

In certain embodiments, the outer surface of the sensing diaphragm is for contacting the soil particles and the pore-water above the sensing diaphragm.

In certain embodiments, the sensing diaphragm has an elastic modulus between 193 GPa and 206 GPa, a Poisson's ratio between 0.24 and 0.3, and a yield strain between 0.001 and 0.0015.

In certain embodiments, the interior space is cylindrical and has a thickness between 8 mm and 18 mm.

In certain embodiments, the plurality of pores has a pore arrangement density between 2 pores/cm$^2$ and 5 pores/cm$^2$, each pore is cylindrical and has a diameter between 0.2 mm and 1 mm.

In certain embodiments, the plurality of pores is evenly distributed in the porous diaphragm.

In certain embodiments, the connector is a rigid ring.

In certain embodiments, each of the sensing diaphragm, the porous diaphragm and the connector comprises steel.

In certain embodiments, the strain sensor is attached on a center of the inner surface.

In certain embodiments, the strain sensor is a fiber Bragg grating (FBG) sensor, or a strain gauge.

In certain embodiments, the effective stress cell further comprises: a protection cover located above the sensing diaphragm in a way that an enclosed space is formed between the protection cover and the sensing diaphragm, wherein a top surface of the protection cover is for contacting the soil particles and the pore-water above the protection cover; and an incompressible fluid filling the enclosed space for transmitting the total stress from the soil particles and the pore-water on the protection cover to the outer surface of the sensing diaphragm.

In certain embodiments, the connector further connects the protection cover.

In certain embodiments, the incompressible fluid is mercury, de-aired water, or de-aired oil.

In certain embodiments, the effective stress cell further comprises a temperature sensor located within the interior space for measuring temperature of the interior space.

Provided herein is a system for measuring effective stress in saturated soil comprising: the effective stress cell described above; and a strain measurement apparatus connecting the strain sensor via a signal line for measuring the strain change on the sensing diaphragm.

In certain embodiments, the system described above further comprises a processor for determining the effective stress based on the measured strain change.

In certain embodiments, the strain sensor is an FBG sensor, the strain measurement apparatus is an optical sensing interrogator.

In certain embodiments, the sensing diaphragm is a circular plate, the strain sensor is an FBG sensor attached on a center of the inner surface, the processor is configured to calculate the effective stress σ' with the following equation:

$$\sigma' = \frac{32D}{C_\varepsilon h a^2 \lambda_{B0}} \Delta\lambda_B$$

where $\lambda_{B0}$ is a Bragg wavelength of the FBG sensor at an initial state, $\Delta\lambda_B$ is a wavelength shift induced by strain change $\Delta\varepsilon$, $C_\varepsilon$ is a coefficient of the FBG sensor corresponding to strain, D is bending stiffness of the circular plate, h is a thickness of the circular plate and a is a radius of the circular plate.

Provided herein is a method for measuring effective stress in saturated soil comprising: locating the effective stress cell described above in saturated soil, wherein the sensing diaphragm faces upward and the porous diaphragm faces downward; allowing pore-water below the porous diaphragm to enter the interior space through the plurality of pores for filling the interior space with the pore-water to balance pore-water pressures on the outer surface and the inner surface of the sensing diaphragm; measuring strain change of the sensing diaphragm under deflection of the sensing diaphragm caused by effective stress in saturated soil; and determining the effective stress based on the measured strain change.

These and other aspects, features and advantages of the present disclosure will become more fully apparent from the following brief description of the drawings, the detailed description of certain embodiments and appended claims.

BRIEF DESCRIPTION OF DRAWINGS

The appended drawings contain figures of certain embodiments to further illustrate and clarify the above and other aspects, advantages and features of the present invention. It will be appreciated that these drawings depict embodiments of the invention and are not intended to limit its scope. The invention will be described and explained with additional specificity and detail through the use of the accompanying drawings in which.

DETAILED DESCRIPTION OF THE INVENTION

The present disclosure provides an effective stress cell for direct measurement of effective stress in saturated soil. The primary concept of this direct measurement is based on the counteraction of pore-water pressures acting on the outer and inner surfaces of a sensing diaphragm so that the average effective stress due to the action of soil particles only is directly measured. The effective stress cell comprises a sensing diaphragm in the front of the cell subjected to total stress from soil particles and pore-water, a porous diaphragm on the back of the cell, a connector and a strain sensor attached at the inner surface of the sensing diaphragm for measuring the strain change of the sensing diaphragm. The sensing diaphragm and the porous diaphragm are connected by the connector in a way that an interior space surrounded by the sensing diaphragm, the porous diaphragm and the connector is formed. The porous diaphragm allows pore-water to enter the interior space. As the pore-water pressures on the outer surface and inner surface of the sensing diaphragm are the same and fully balanced, the pore-water pressure in soil will not cause any deflection of the sensing diaphragm and the deflection of the sensing diaphragm is only caused by the average value of all vertical (normal) fractions of particle contact forces. This average value of all vertical (normal) fractions of particle contact forces is the effective stress σ'. Therefore, the effective stress is directly measured by the strain sensor using only one diaphragm and at one location.

Figure 1A:
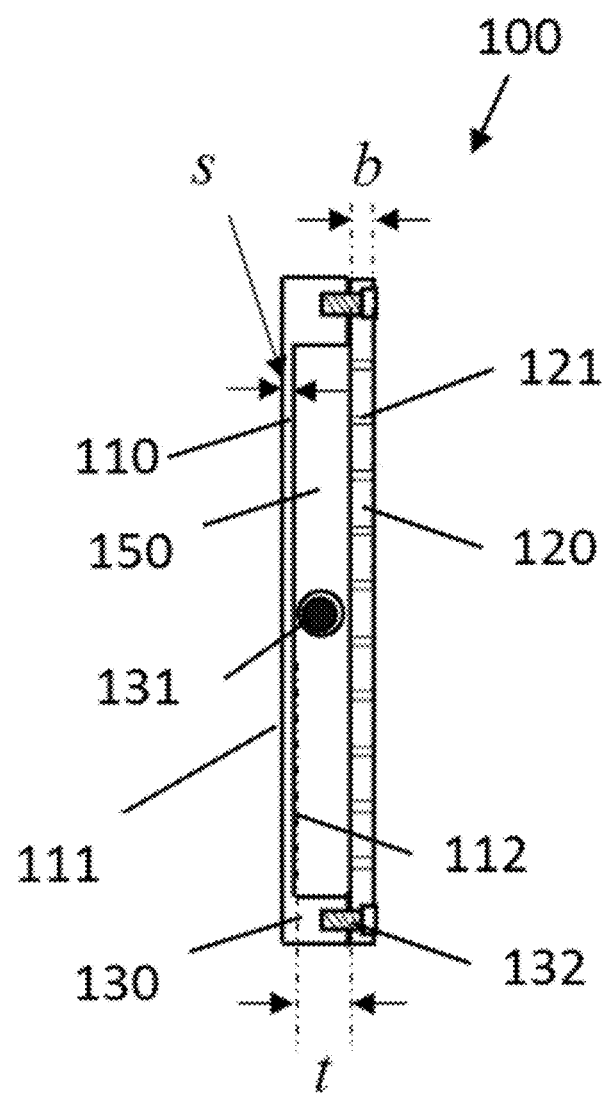
FIG. 1A is a schematic diagram depicting a lateral view of an effective stress cell according to certain embodiments.
Figure 1B:
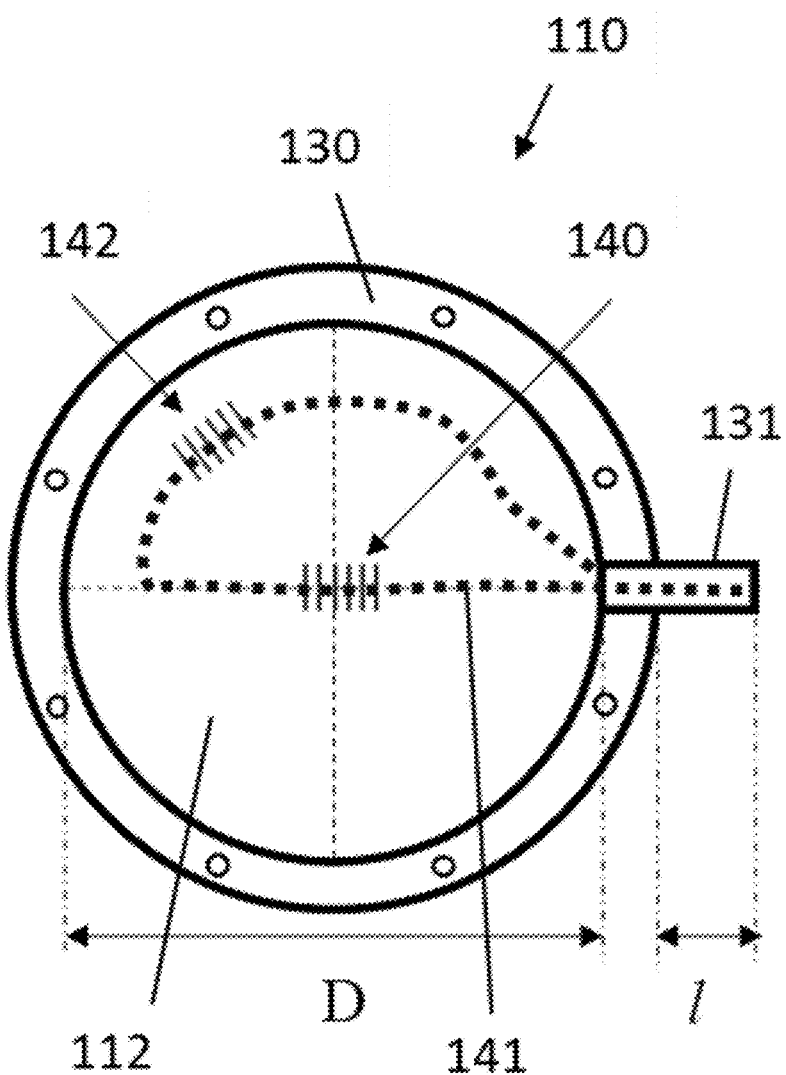
FIG. 1B is a schematic diagram depicting the sensing diaphragm of the effective stress cell.
Figure 1C:
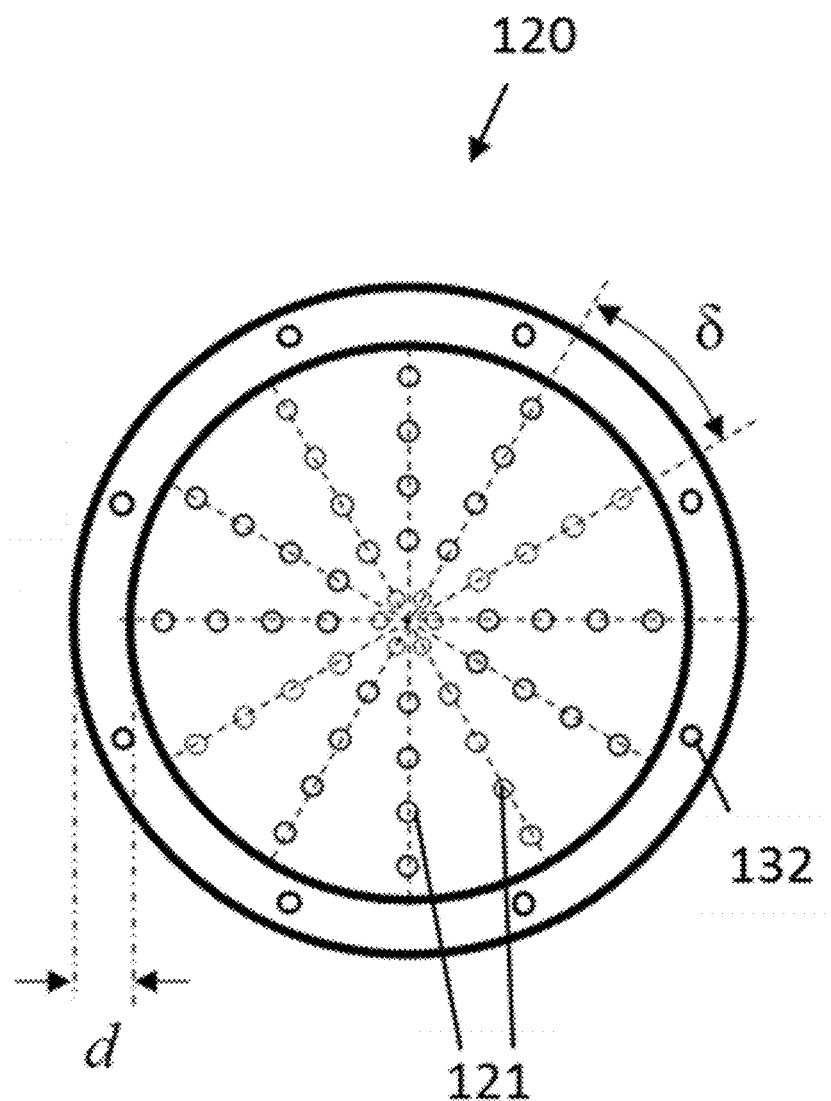
FIG. 1C is a schematic diagram depicting the porous diaphragm of the effective stress cell.

As shown in FIGS. 1A-1C, an effective stress cell 100 according to certain embodiments comprises a sensing diaphragm 110, a porous diaphragm 120, a connector 130 and a strain sensor 140. The outer surface 111 is subjected to total stress from soil particles and pore-water above the sensing diaphragm 110, and the inner surface 112 is opposite to the outer surface 111. The porous diaphragm 120 prevents soil particles below the porous diaphragm 120 from passing through the porous diaphragm 120 and comprises a plurality of pores 121 for allowing pore-water below the porous diaphragm 120 to pass through the porous diaphragm 120. The connector 130 connects the sensing diaphragm 110 and the porous diaphragm 120 in a way that an interior space 150 surrounded by the inner surface 112 of the sensing diaphragm 110, the porous diaphragm 120 and the connector 130 is formed. The strain sensor 140 is attached to the inner surface 112 for measuring strain change on the sensing diaphragm 110 under deflection of the sensing diaphragm 110. The plurality of pores 121 allows the pore-water below the porous diaphragm 120 to enter the interior space 150 for filling the interior space 150 with the pore-water to balance pore-water pressures on the outer surface 111 and the inner surface 112 of the sensing diaphragm 110 such that the deflection of the sensing diaphragm 110 towards the interior space 150 is only caused by the effective stress such that the effective stress is directly determined by the measured strain change without measuring pore-water pressure in the saturated soil.

In this embodiment, the sensing diaphragm 110 and the connector 130 are formed together at the same time and the porous diaphragm 120 is connected to the connector 130 by screws 132. The porous diaphragm 120 is circular and the plurality of pores 121 are radially and symmetrically aligned in the porous diaphragm 120. As the plurality of pores 121 are through holes, the pore-water in saturated soil can enter the interior space 150 via the plurality of pores 121.

In this embodiment, the strain sensor 140 is attached on the center of the inner surface 112 of the sensing diaphragm 110 for being subjected to largest deflection that enhances measurement accuracy. The strain sensor 140 is connected to a signal line 141 and the connector 130 has an outlet 131 for the signal line 141 such that the strain sensor 140 can be connected to a strain measurement apparatus via the signal line 141. The effective stress cell 100 further comprises a temperature sensor 142 for measuring temperature within the interior space 150. The temperature sensor 142 is also connected to the signal line 141.

In certain embodiments, the effective stress cell is cylindrical and has a diameter between 5 cm and 20 cm and a thickness between 10 mm and 20 mm.

In certain embodiments, the sensing diaphragm is circular and has a diameter between 5 cm and 20 cm and a thickness between 1 mm and 3 mm. In certain embodiments, the sensing diaphragm has an elastic modulus between 193 GPa and 206 GPa, a Poisson's ratio between 0.24 and 0.3, and a yield strain between 0.001 and 0.0015.

In certain embodiments, the porous diaphragm is circular and has a diameter between 5 cm and 20 cm and a thickness between 1 mm and 3 mm.

In certain embodiments, the connector is ring-shaped and has a diameter between 5 cm and 20 cm and a thickness between 5 mm and 15 mm. In certain embodiments, the connector is a rigid ring located at the perimeters of the sensing diaphragm and the porous diaphragm and between the sensing diaphragm and the porous diaphragm for separating the sensing diaphragm and the porous diaphragm.

In certain embodiments, each of the sensing diaphragm, the porous diaphragm and the connector comprises a metal. The metal can be copper, aluminum, or steel. The steel can be stainless steel or galvanized steel.

In certain embodiments, the interior space is cylindrical and has a thickness between 8 mm and 18 mm.

In certain embodiments, each pore is cylindrical and has a diameter between 0.2 mm and 1 mm. The pores having smaller size can enhance the entry of pore-water into the interior space under capillary effect. In certain embodiments, the plurality of pores has a pore arrangement density between 2 pores/cm$^2$ and 5 pores/cm$^2$.

In certain embodiments, the plurality of pores is evenly distributed in the porous diaphragm. The pores evenly distributed in the porous diaphragm can facilitate the entry of the pore-water into the interior space in an even manner. In certain embodiments, the plurality of pores is radially and symmetrically distributed in the porous diaphragm.

In certain embodiments, the connector and the sensing diaphragm are formed together at the same time.

In certain embodiments, the sensing diaphragm, the porous diaphragm and the connector are connected by welding, soldering, screwing, or bolt and nut.

The parameters of the effective stress cell, e.g., size, thickness, material, can be changed in order to satisfy the different requirements of pressure capacity and pressure sensitivity.

In certain embodiments, the strain sensor is a fiber Bragg grating (FBG) sensor or a strain gauge. In certain embodiments, the strain sensor is attached on the center of the inner surface.

In certain embodiments, the strain sensor is an FBG sensor. The FBG sensor has the following advantages: immunity to electromagnetic interference (EMI) which guarantees quality signals and data; long-term stability (since measurement is based on the light wavelength changes) which makes the sensors suitable for long-term monitoring, e.g., 50 to 100 years in principle; excellent accuracy (e.g., up to $1\times10^{-6}$ strain) which makes our measurement more accurate; high resistance to corrosion (since the core fiber is silica) which makes the fiber sensors last for a long time in corrosive environments, multiplexing for FBG sensors which can measure strains and temperatures (or other parameters specially designed transducers based on the FBGs) at multi-points along one fiber line; tinny size of the fiber sensors which be used to measure the parameters in a very small region (local strains, cracks, displacements, etc.); and long-distance sensing which can measure over a large area or from a far distance and is very good for large geotechnical structures.

In certain embodiments, one FBG sensor is used for strain measurement of the sensing diaphragm and one FBG sensor is for temperature measurement in the interior space between the sensing diaphragm and the porous diaphragm, such that temperature compensation can be achieved.

Figure 2:
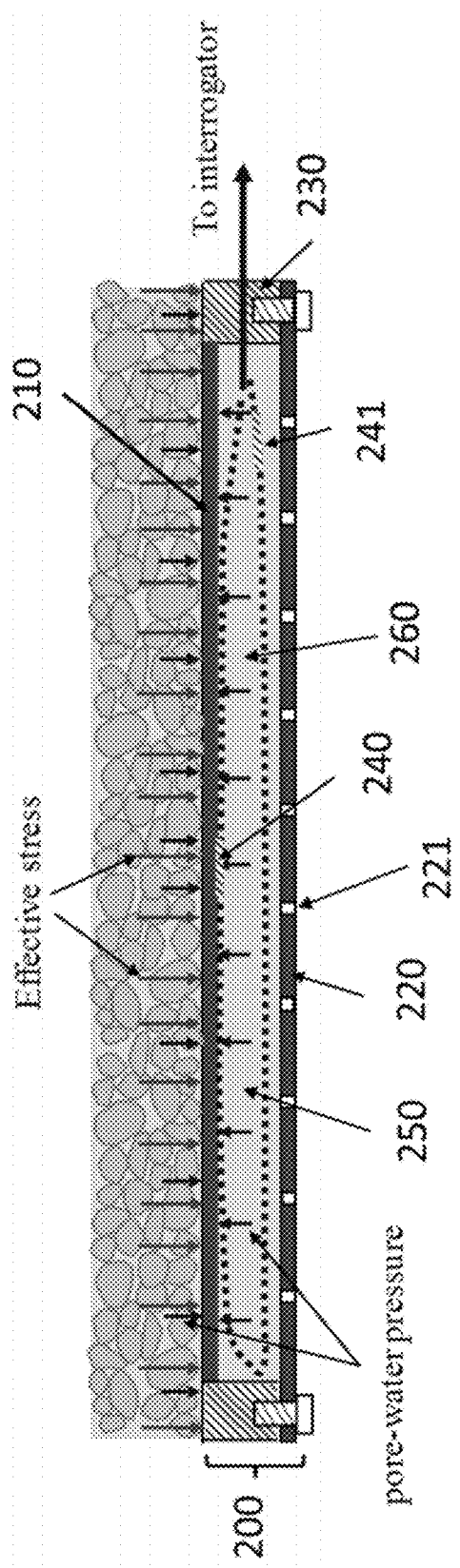
FIG. 2 is a schematic diagram depicting effective stress measurement of an effective stress cell according to certain embodiments.

FIG. 2 is a schematic diagram depicting effective stress measurement of an effective stress cell according to certain embodiments. The effective stress cell 200 comprises a sensing diaphragm 210, a porous diaphragm 220 having pores 221, a rigid ring 230 (i.e., a connector), a first FBG sensor 240 located at the center of the inner surface of the sensing diaphragm 210 and a second FBG sensor 241 located in the middle of an interior space 250 within the effective stress cell 200. The outer surface of the sensing diaphragm 210 contacts soil particles and pore-water and is subjected to the total stress form the soil particles and the pore-water. The pores 221 allow pore-water 260 in saturated soil to enter the interior space 250 to fill up the interior space 250 such that pore-water pressures on the outer surface and the inner surface of the sensing diaphragm 210 are balanced. Thus, the strain change on the sensing diaphragm 210 is only caused by the effective stress, and the effective stress can be directly determined by the measured strain change. The first FBG sensor 240 is located at the center of the inner surface of the sensing diaphragm 210 and measures the strain change on the sensing diaphragm 210 under deflection of the sensing diaphragm 210. The second FBG sensor 241 is located in the middle of the interior space 250 and measures temperature change in the interior space 250 for temperature compensation to the measurement of the first FBG sensor 240. The first FBG sensor 240 and the second FBG sensor 241 are connected to an optical sensing interrogator via a signal line.

Figure 3:
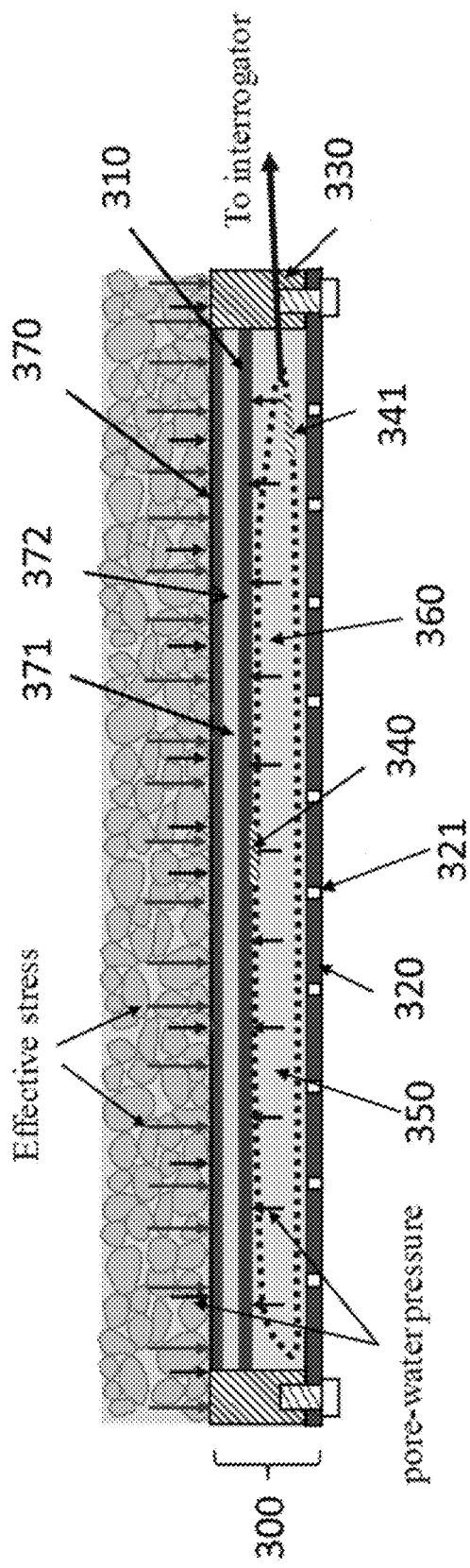
FIG. 3 is a schematic diagram depicting effective stress measurement of an effective stress cell with incompressible fluid protection according to certain embodiments

FIG. 3 is a schematic diagram depicting effective stress measurement of an effective stress cell with incompressible fluid according to certain embodiments. The effective stress cell 300 comprises a sensing diaphragm 310, a porous diaphragm 320 having pores 321, a rigid ring 330, a first FBG sensor 340 for measuring the strain change on the sensing diaphragm 310, a second FBG sensor 341 for measuring temperature, a protection cover 370 and an incompressible fluid 371. The pores 321 allow pore-water 360 in saturated soil to enter an interior space 350 within the effective stress cell to fill up the interior space 350 such that the pore-water pressures on the outer surface and the inner surface of the sensing diaphragm 310 are balanced. The protection cover 370 is located above the sensing diaphragm 310 and connects to the rigid ring 330 to form an enclosed space 372 enclosed by the protection cover 370, the outer surface of sensing diaphragm 310 and the rigid ring 330. The incompressible fluid 371 fills the enclosed space 372 for protecting the sensing diaphragm 310. The top surface of the protection cover 370 contacts solid particles and pore-water in saturated soil and is subject to total stress from the solid particles and the pore-water. As the incompressible fluid 371 is incompressible, the total stress acting on the protection cover 370 is directly transferred to the outer surface of the sensing diaphragm 310 via the incompressible fluid 371. Thus, the protection cover 370 and the incompressible fluid 371 can protect the sensing diaphragm 310 from soil particles without affecting the accuracy of the effective stress measurement, thereby improving the lifetime of the effective stress cell 300. In addition, the incompressible fluid 371 can provide more uniform pressure exertion on the sensing diaphragm 310.

In certain embodiments, the protection cover comprises a plate and a protruding portion locating at the perimeter of the plate for connecting to the sensing diaphragm.

In certain embodiments, the protection cover comprises copper, aluminum, or steel. The steel can be stainless steel or galvanized steel.

In certain embodiments, the enclosed space has a height between 3 mm and 7 mm.

In certain embodiments, the incompressible fluid is mercury, de-aired water, or de-aired oil.

Figure 4:
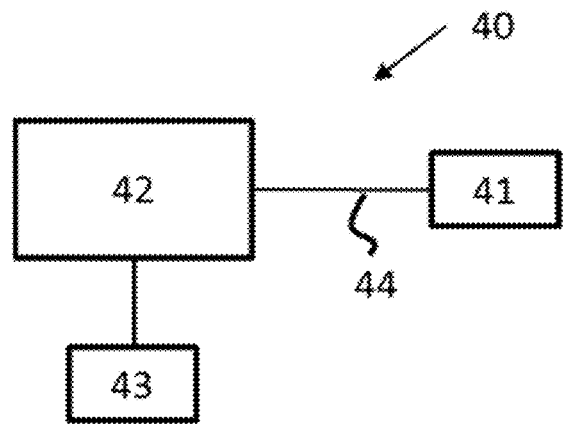
FIG. 4 is a block diagram depicting a system for measuring effective stress in saturated soil according to certain embodiments.

The present disclosure provides a system for measuring effective stress in saturated soil. FIG. 4 is a block diagram depicting a system for measuring effective stress in saturated soil according to certain embodiments. The system 40 comprises an effective stress cell 41 described above as 100, 200, and 300 according to the embodiments of FIGS. 1A, 2 and 3, respectively, a strain measurement apparatus 42 and a processor 43. The strain measurement apparatus 42 connects the strain sensor (140, 240, or 340) of the effective stress cell 41 via a signal line 44 for measuring strain change on the sensing diaphragm (110, 210, or 310). The processor 43 determines the effective stress based on the measured strain change.

In certain embodiments, the strain sensor is an FBG sensor, the strain measurement apparatus is an optical sensing interrogator.

Figure 5:
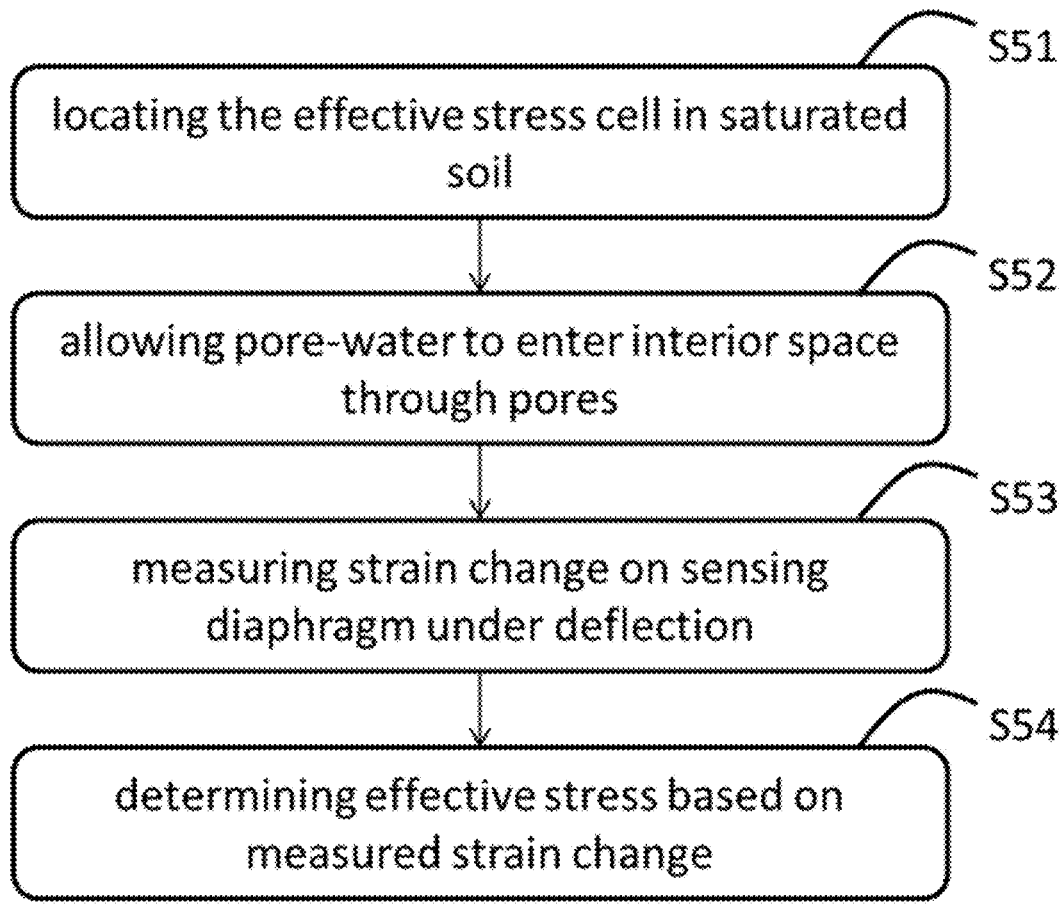
FIG. 5 is a flow chart depicting a method for measuring effective stress in saturated soil according to certain embodiments.

The present disclosure provides a method for measuring effective stress in saturated soil. FIG. 5 is a flow chart depicting a method for measuring effective stress in saturated soil according to certain embodiments. In step S51, the effective stress cell described above is located in saturated soil. The sensing diaphragm faces upward and the porous diaphragm faces downward. In step S52, pore-water below the porous diaphragm is allowed to enter the interior space through the plurality of pores for filling the interior space with the pore-water to balance pore-water pressures on the outer surface and the inner surface of the sensing diaphragm. In step S53, strain change on the sensing diaphragm is measured under deflection of the sensing diaphragm caused by effective stress in saturated soil. In step S54, the effective stress is directly determined based on the measured strain change.

An FBG-based effective stress cell is provided for direct measurement of effective stress in soil according to certain embodiments. The Bragg wavelength of an FBG sensor changes linearly with the strain change $\Delta\varepsilon$ and temperature variation $\Delta T$. Thus, the equation of the FBG sensor for measuring strain or temperature is:

$$\frac{\Delta\lambda_B}{\lambda_{B0}} = C_\varepsilon \Delta\varepsilon + C_T \Delta T \qquad (3)$$

where $\lambda_{B0}$ is the Bragg wavelength at the initial state, $\Delta\lambda_B$ is the wavelength shift induced by strain change $\Delta\varepsilon$ and temperature variation $\Delta T$; $C_\varepsilon$ and $C_T$ are coefficients corresponding to strain and temperature with typical values of 0.78 and $6.67 \times 10^{-6}$/° C., respectively.

Figures 6A, 6B:
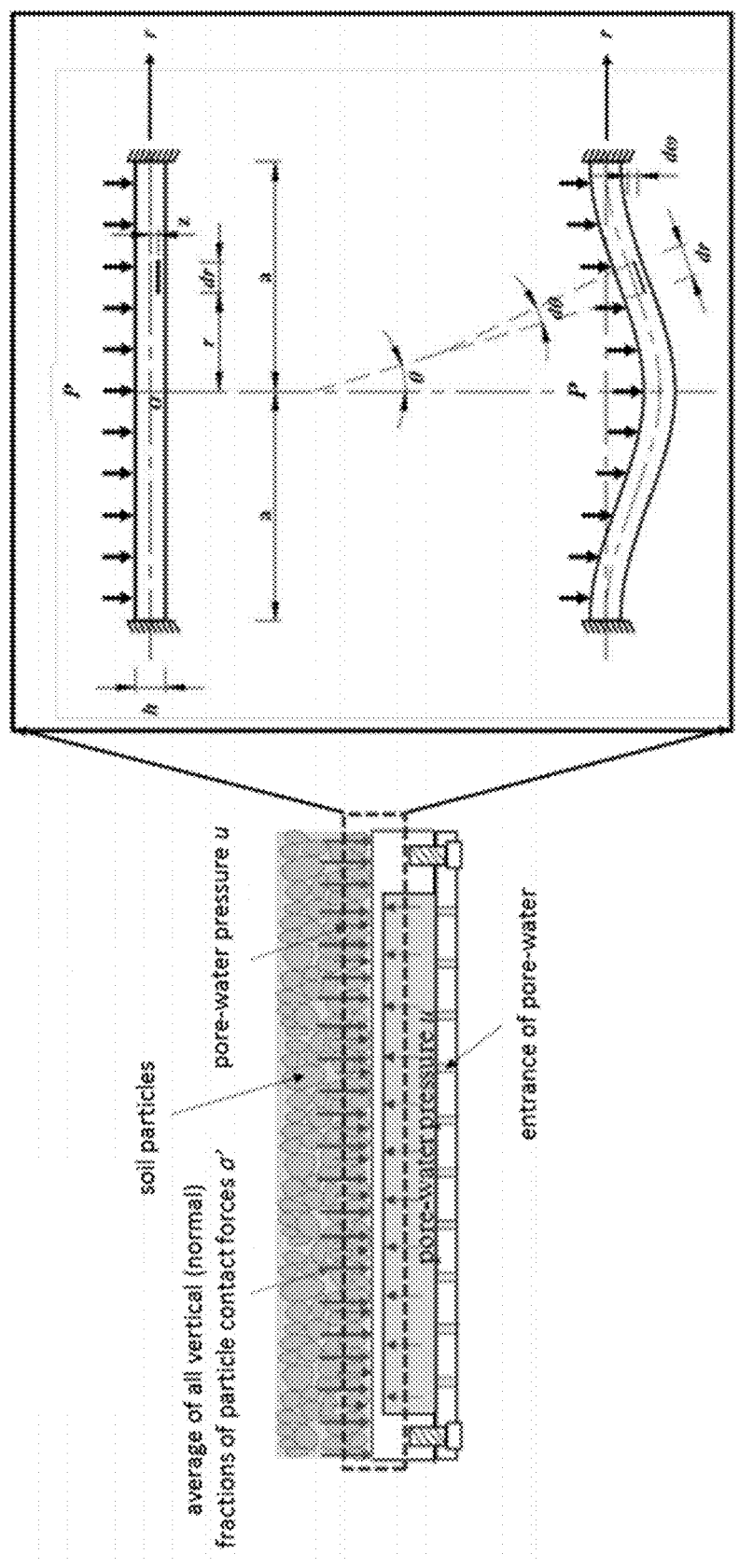
FIG. 6A is a schematic diagram depicting the working principle of a cylindrical effective stress cell according to certain embodiments.
FIG. 6B is a schematic diagram depicting the thin plate theory for the circular sensing diaphragm of the effective stress cell.

FIG. 6A is a schematic diagram depicting the working principle of an effective stress cell according to certain embodiments. A circular stainless-steel plate with 1 mm thickness is used as the sensing diaphragm. It is assumed that the pressure is uniformly exerted over the whole area of the sensing diaphragm. According to the thin plate theory as shown in FIG. 6B, when a circular thin plate with clamped edges is imposed by a uniform pressure (p), the amount of deflection ($\omega$) induced at a certain radial distance (r) from the center of the plate is calculated as:

$$\omega = \frac{3p(1-v^2)}{16Eh^3}(a^2 - r^2)^2 \qquad (4a)$$

where υ and E are Poisson's ratio and elastic modulus of the plate material, respectively; h is the thickness of the circular plate and a is the radius of the plate.

Denoting $D=Eh^3/12(1-υ^2)$ as bending stiffness of the plate, the deflection is rewritten as:

$$\omega = \frac{p}{64D}(a^2 - r^2)^2 \quad (4b)$$

The strain in radial direction is:

$$\varepsilon_r = -z\frac{d^2\omega}{dr^2} = z\frac{p}{16D}(a^2 - 3r^3) \quad (5)$$

where z is the distance from the neutral axis of the plate.

If the FBG sensor is adhered on the back surface (z=h/2) and at center (r=0) of the plate, the FBG sensor measures the maximum strain which is obtained by:

$$\varepsilon_{r,max} = \varepsilon_{r,r=0} = \frac{h}{2}\frac{p}{16D}a^2 = \frac{p}{32D}ha^2 \quad (6)$$

Substituting Eqn. (6) into Eqn. (3), noting $\Delta\varepsilon = \varepsilon_{r,max}$ the relationship of the shift in Bragg wavelength and applied pressure is given as:

$$\frac{\Delta\lambda_B}{\lambda_{B0}} = C_\varepsilon \frac{p}{32D}ha^2 + C_T\Delta T \quad (7)$$

The temperature change ΔT can be measured separately. When a constant temperature is kept, ΔT was zero. Thus, Eqn. (7) is simplified as:

$$\frac{\Delta\lambda_B}{\lambda_{B0}} = C_\varepsilon \frac{p}{32D}ha^2 \quad (8)$$

Hence, the shift in Bragg wavelength is proportional to the applied pressure p.

As shown in FIG. 6A, the important role of the porous diaphragm in the back is to allow pore-water to enter the interior space between the sensing diaphragm and the porous diaphragm and transmit pore-water pressure to the back surface of the sensing diaphragm. The front surface of the sensing diaphragm is subjected to a pore-water pressure with the same magnitude as that on the back and the average value of all vertical (normal) fractions of particle contact forces over the sensing diaphragm. The pore-water pressures on the front surface and back surface of the sensing diaphragm are the same and fully balanced so that the pore-water pressure in soil will not cause any deflection of the sensing diaphragm. The deflection of the sensing diaphragm is caused by the average value of all vertical (normal) fractions of particle contact forces only. This average value of all vertical (normal) fractions of particle contact forces is effective stress σ'. Considering the design in FIG. 6A, Eqn. (8) can be written as:

$$\sigma' = p = \frac{32D}{C_\varepsilon ha^2}\frac{\Delta\lambda_B}{\lambda_{B0}} = \frac{32D}{C_\varepsilon ha^2\lambda_{B0}}\Delta\lambda_B \quad (9)$$

Eqn. (9) is used to measure the effective stress directly.

Figure 7:
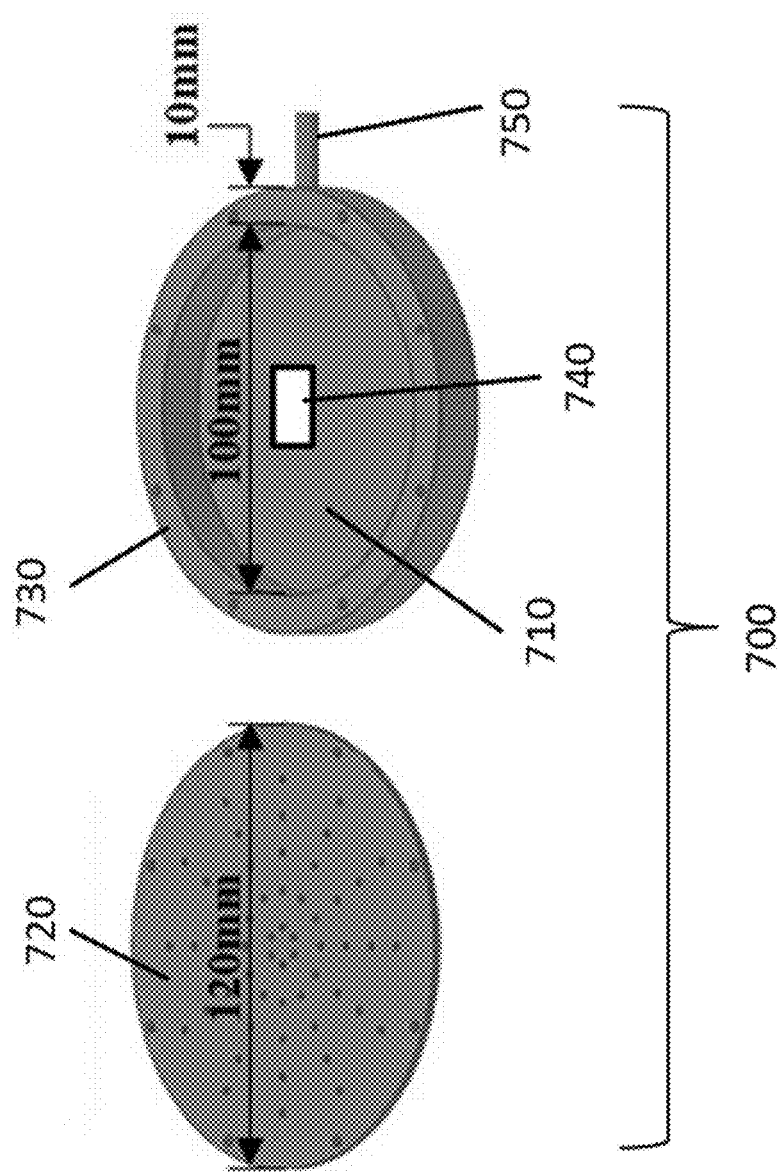
FIG. 7 is a schematic diagram depicting an FBG-based effective stress cell according to certain embodiments.

FIG. 7 is a schematic diagram depicting an FBG-based effective stress cell according to certain embodiments. The FBG-based effective stress cell 700 includes a circular sensing diaphragm 710, a circular porous diaphragm 720, a rigid ring 730, and an FBG sensor 740. The external diameter and total thickness of the FBG-based effective stress cell 700 are 120 mm and 16 mm respectively. The sensing diaphragm 710 is 100 mm in diameter and 1 mm in thickness. The porous diaphragm 720 is 120 mm in diameter and 2 mm in thickness and includes pores of 2 mm in diameter. The rigid ring 730 is 120 mm in diameter, 10 mm in width and 14 mm in thickness. The sensing diaphragm 710, the porous diaphragm 720 and the rigid ring 730 are made of 316 stainless steel which has an elastic modulus of 193 GPa, Poisson's ratio of 0.3, and a yield strain of ±1050 με. Substituting all the values into Eqn. (6), the maximum pressure p of the FBG-based effective stress cell is 201.9 kPa. The FBG sensor 740 with 10 mm in length and a central wavelength $\lambda_{B0}$ of 1542 nm is attached to the center of inner surface of the sensing diaphragm 710 and well protected by epoxy adhesives. In consideration of multiplexing, the FBG sensor 740 is connected with a two-core single mode fiber by using arc fusion splicer. The rigid ring 730 has a fiber cable outlet 750, and the two-core single mode fiber can be connected to an optical sensing interrogator via the fiber cable outlet 750.

The FBG-based effective stress cell of FIG. 7 was calibrated by applying water pressure with the porous diaphragm temporarily replaced by an impermeable stainless-steel disk in a water container. When the impermeable stainless-steel disk was employed to replace the porous diaphragm in the calibration tests, the rigid ring and the impermeable stainless-steel disk were fitted together and sealed by O-ring so that no water could enter the cell inside. The FBG-based effective stress cell with the impermeable stainless-steel disk was placed in a water container with 300 mm in diameter and 500 mm in height with a water-tight cover. A pressure controller was used to provide a stable water pressure with a resolution of 1 kPa and a pressure range from 0 to 2000 kPa. Besides, the optical fiber was connected to an FBG interrogator to take readings. In order to evaluate the repeatability of the FBG-based effective stress cell and obtain more accurate value of the calibration coefficient, two cycles including loading and unloading were performed.

Figure 8:
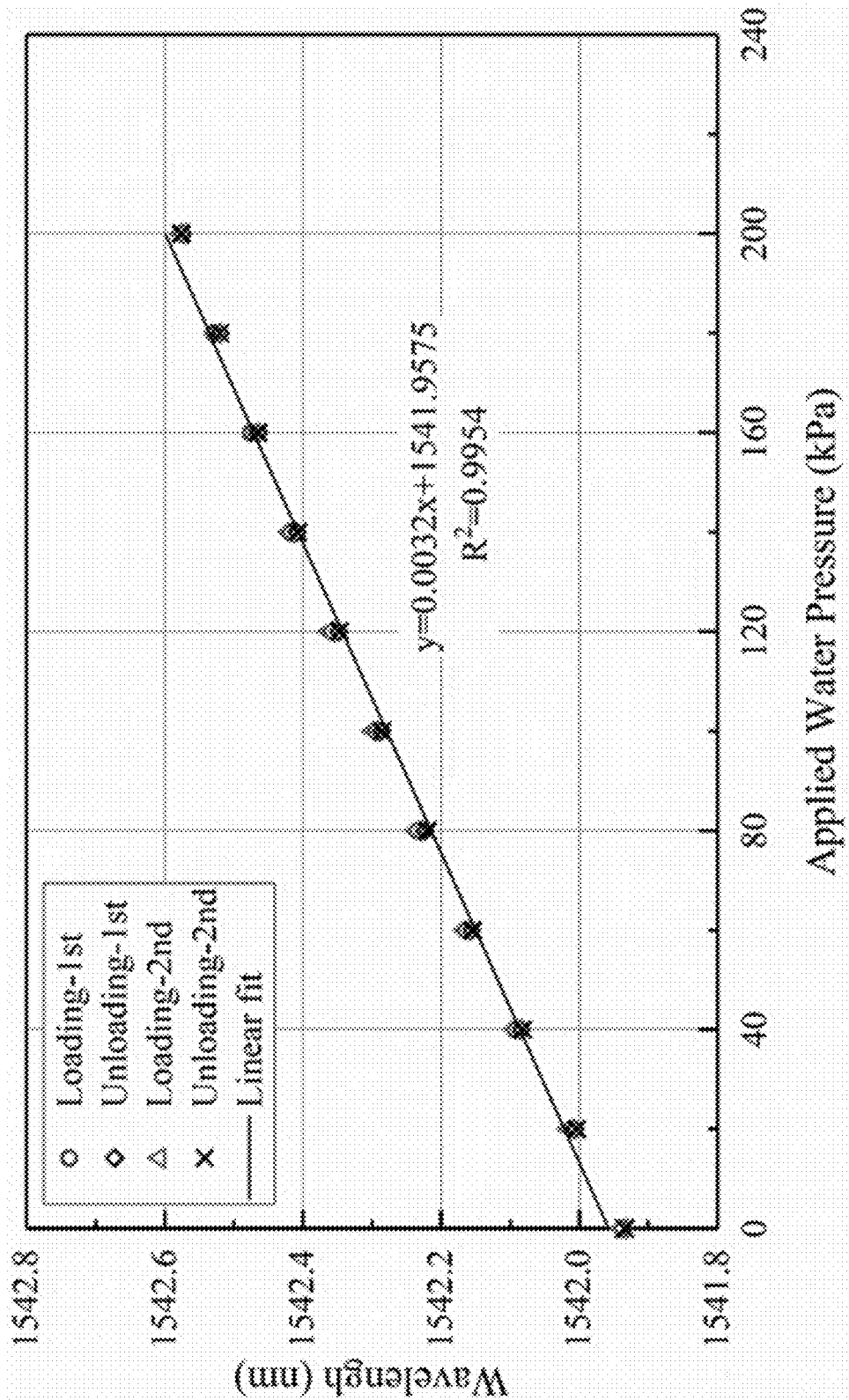
FIG. 8 is a plot showing the results of a calibration test for the FBG-based effective stress cell of FIG. 7.

In the calibration tests, the water pressure in the range of 0 to 200 kPa at 20 kPa increments was applied. FIG. 8 shows calibration results for both loading and unloading. The results of two loading-unloading cycles exhibit that the designed FBG-based effective stress cell has a good repeatability. Furthermore, a linear relationship between the reflected Bragg wavelength and applied water pressure is observed. The reflected Bragg wavelength rises from 1541.96 nm to 1542.58 nm with an increased water pressure from 0 kPa to 200 kPa. By adopting the least-squares method, a linear transfer function with a good coefficient of determination (COD) value of 0.9954 is obtained and shown in FIG. 8. It is found from the (slope=$\Delta\lambda_B/p$) in FIG. 8 is 0.0032 nm/kPa, and the pressure resolution of this effective stress cell is 0.31 kPa when the FBG sensor is interrogated by the optical sensing interrogator (SM125) which has a 0.001 nm (or 1 pm) wavelength resolution. According to Eqn. (9), the slope (slope=$\Delta\lambda_B/p$) calculated is 0.0053 nm/kPa, larger than the measured value of 0.0032 nm/kPa. There are two main reasons: (a) the strain measured by the FBG sensor was an average strain within an FBG sensor length of 10 mm; while the strain in Eqn. (6) is the maximum strain at the center (r=0) and (b) the adhesive strength and thickness of epoxy adhesives increased the bending stiffness of the sensing diaphragm which decreased the strain under the same applied pressure. The measured slope is more reliable. The calibrated coefficient is $p/\Delta\lambda_B=1/0.0032=312.5$ (kPa/nm).

Accordingly, the calibration results demonstrate that the response of the FBG-based effective stress cell to the applied pressure exhibits good linearity with high accuracy. The pressure sensitivity of 0.0032 nm/kPa for the FBG-based effective stress cell can be employed in applications. When the FBG sensor is interrogated by an optical sensing interrogator with a 0.001 nm (or 1 pm) wavelength resolution, the pressure resolution of the FBG-based effective stress cell is 0.31 kPa.

Figure 9A:
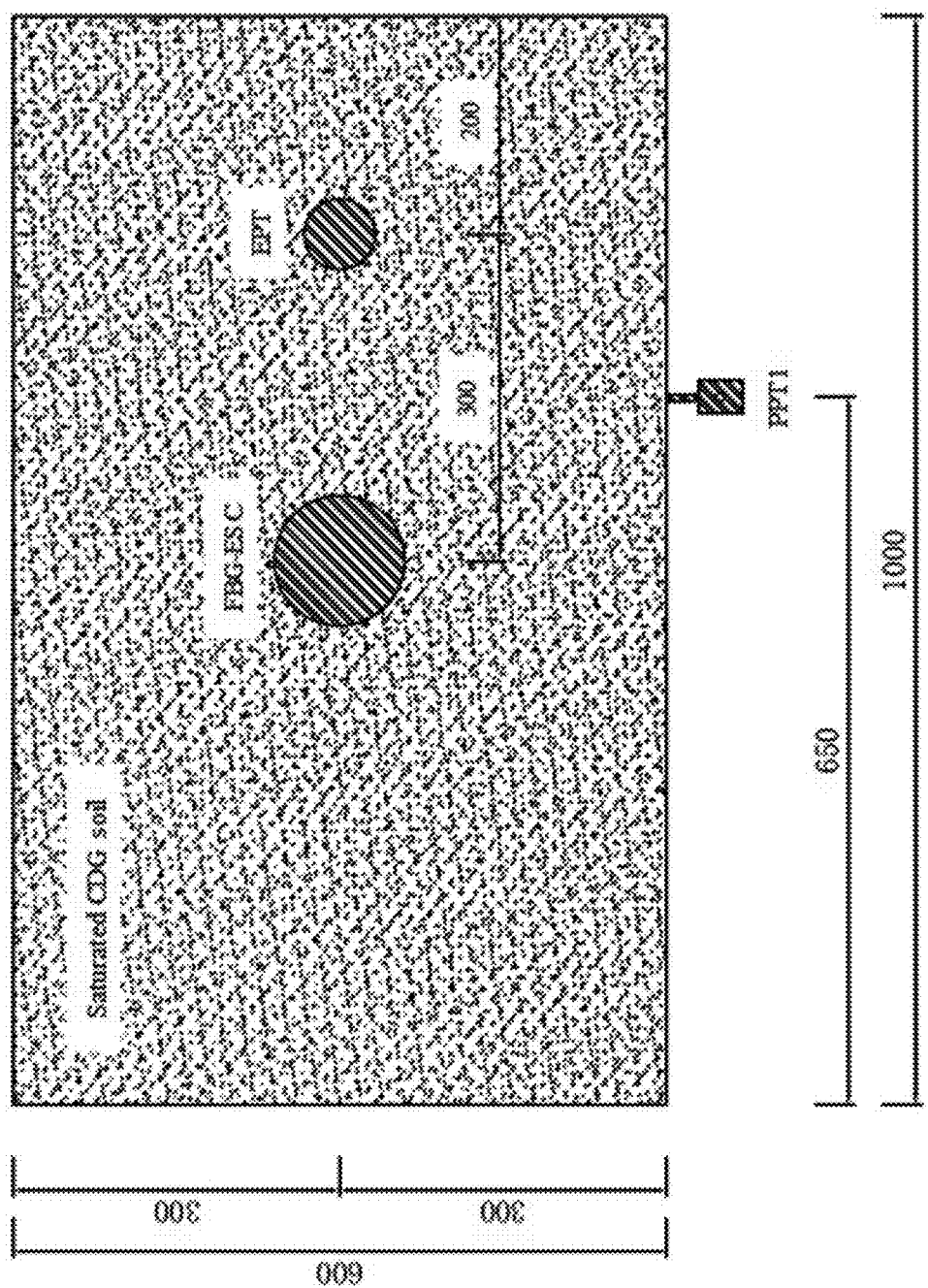
FIG. 9A is a schematic diagram depicting a top view of a physical model test according to certain embodiments.
Figure 9B:
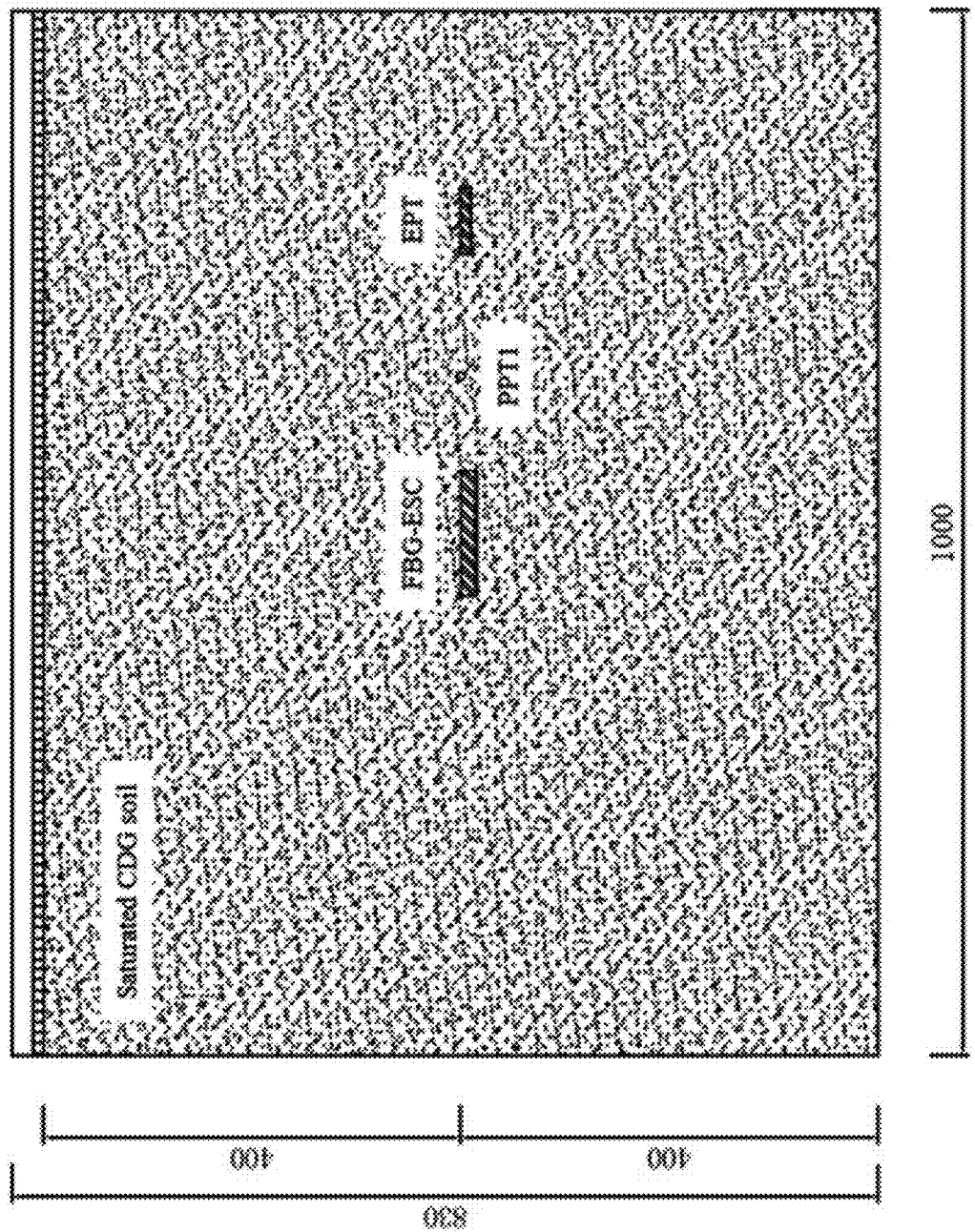
FIG. 9B is a schematic diagram depicting a side view of the physical model test.

One physical model test was carried out to verify the workability and accuracy of the FBG-based effective stress cell in a large physical model shown in FIGS. 9A and 9B. The internal dimensions of the container of the physical model are 1000 mm in length, 600 mm in width, and 830 mm in height. There was a rubber membrane fixed on the inner surface of the top cover. A pressure regulator was utilized to control water pressure inside the rubber membrane so that the vertical pressure on a saturated completely decomposed granite (CDG) soil inside the physical model could be controlled. The inner surface of the container was lined with a smooth stainless-steel sheet. Lubricating oil was spread on the stainless-steel sheet and a flexible plastic film was used to cover the steel sheet, thereby reducing the friction between the soil and the sidewalls of the container.

In order to monitor the applied pressure provided by rubber membrane, a conventional pore-water pressure transducer (PPT2) was mounted on the top cover of the large container. The FBG-based effective stress cell (FBG-ESC) of FIG. 7 was embedded in a fully saturated completely decomposed granite (CDG) soil at a depth of 400 mm, together with a conventional earth pressure transducer (EPT), and a conventional pore-water pressure transducer (PPT1) installed on the sidewall of the large container at the same level as shown in FIGS. 9A and 9B. EPT, PPT1, and PPT 2 were all calibrated in a sealed Perspex cylinder with water pressure. During the test, the FBG sensor was interrogated by an optical sensing interrogator while data of conventional transducers were acquired by a data logger.

Figure 10A:
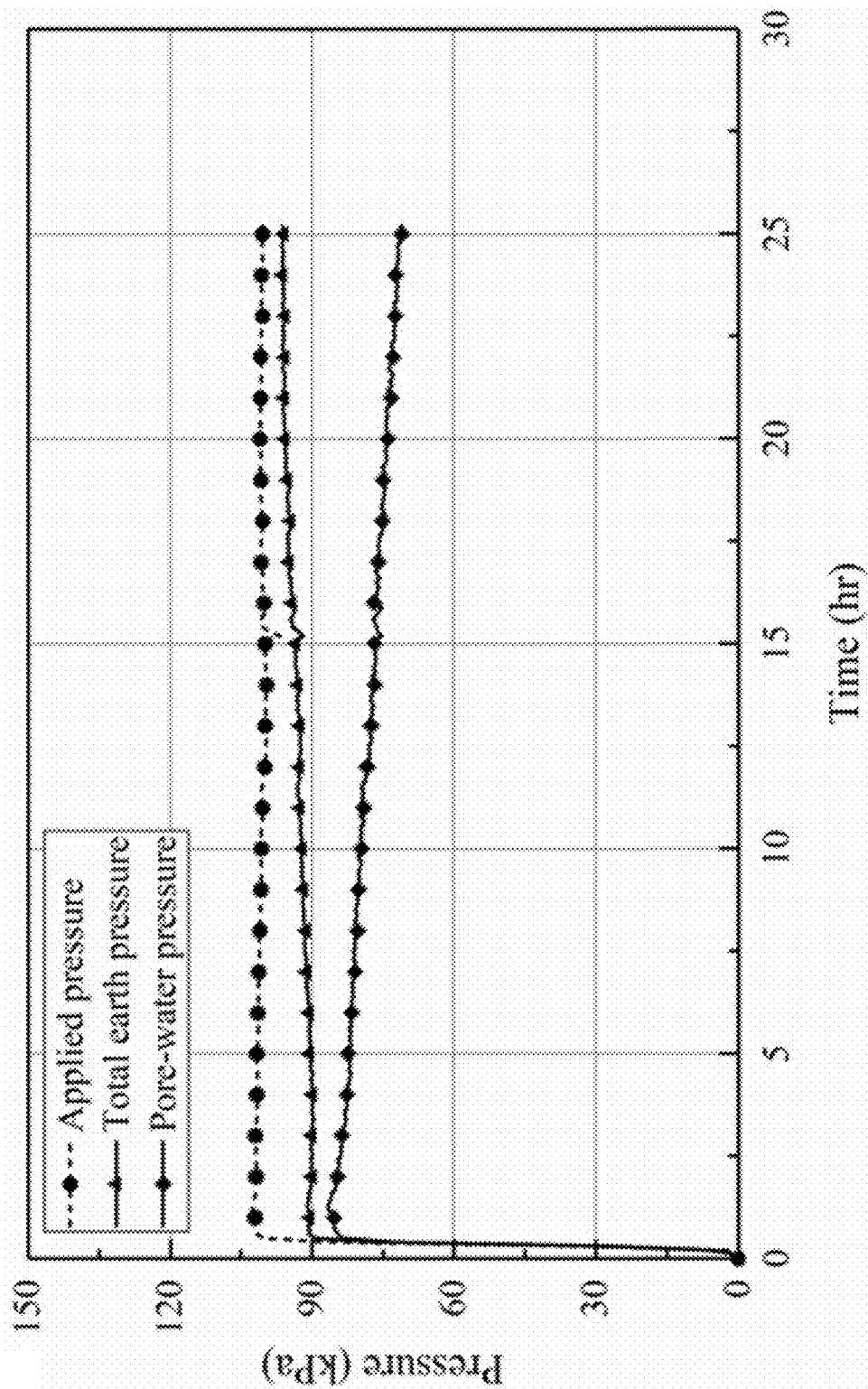
FIG. 10A is a plot showing the results measured by conventional pore-water pressure and total earth pressure transducers of the physical model test for a short period.

A preparation stage with an average overburden pressure of 30 kPa was imposed on the top of soil first. This pressure of 30 kPa was held for 1000 hours to let (a) the contact pressure between the rubber membrane and the top soil surface and (b) the contact of all cells with surrounding soils. After 1000 hours, the pressure of water in the rubber membrane was unloaded to zero and then increased to 100 kPa. The test results, including the applied pressure, total earth pressure, and pore-water pressure measured by the conventional transducers (PPT2, EPT, and PPT1), under the average overburden pressure of 100 kPa are shown in FIG. 10A. The measured pore-water pressure is decreased gradually due to the dissipation of excess pore-water pressure or consolidation of the soil over time.

Figure 10B:
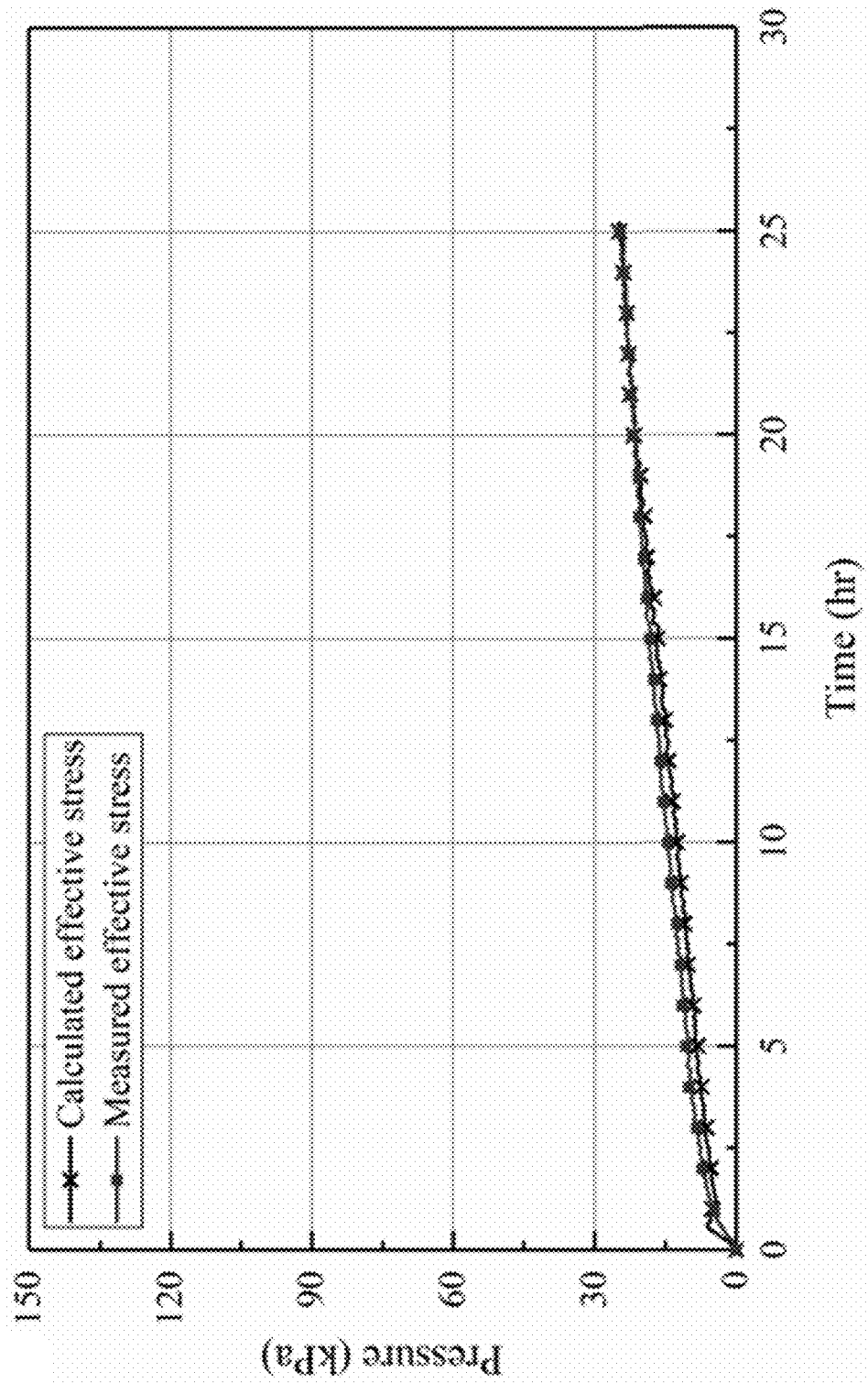
FIG. 10B is a plot showing comparison results between the conventionally calculated effective stress and the directly measured effective stress of the physical model test for a short period.
Figure 11A:
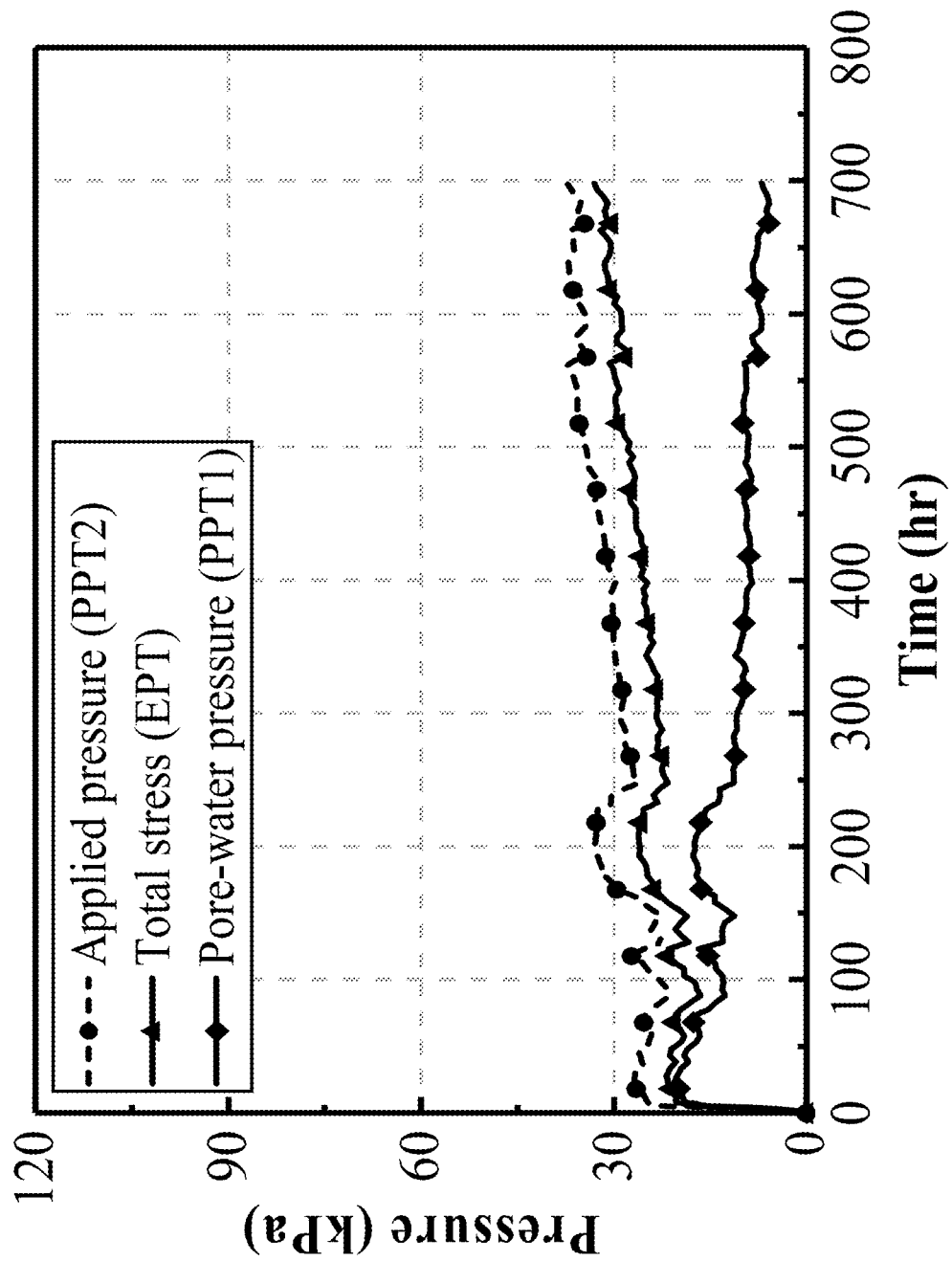
FIG. 11A is a plot showing the results measured by conventional pore-water pressure and total earth pressure transducers of the physical model test for a long period.
Figure 11B:
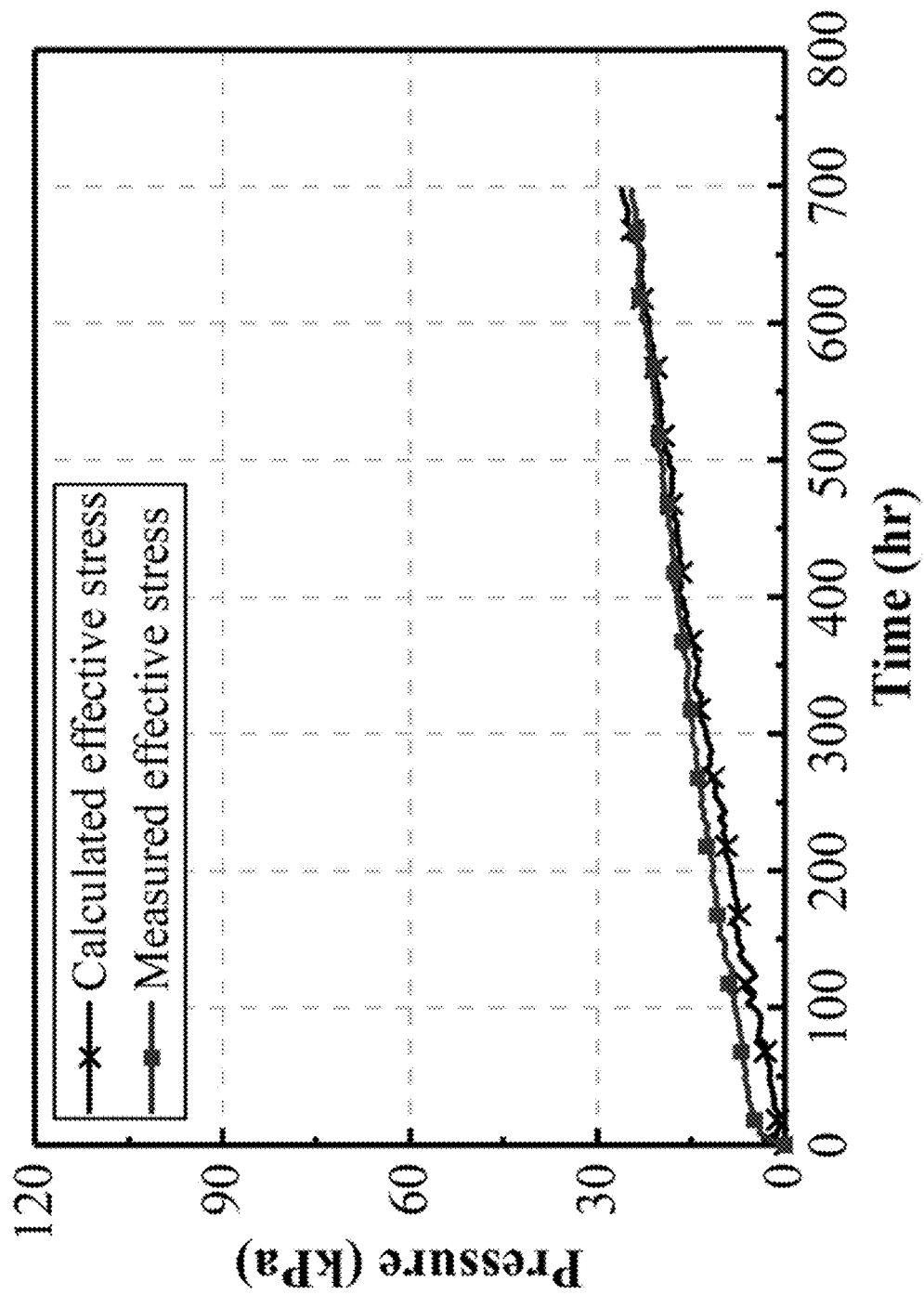
FIG. 11B is a plot showing comparison results between the conventionally calculated effective stress and the directly measured effective stress of the physical model test for a long period.

Since the physical model test was carried out in a saturated soil, the effective stress can be calculated by subtracting the pore-water pressure from the total earth pressure using Eqn. (1c) as an indirect measurement method. The calculated effective stress for the test is shown in FIG. 10B. The effective stress directly measured using the FBG-based effective stress cell in the test is also shown in FIG. 10B for comparison. The measured effective stress in FIG. 10B increases gradually with the dissipation of excess pore-water pressure over time, exhibiting a good reliability of the FBG-based effective stress cell. Similar physical model test for a long period with 700 hr was conducted and similar test results are also obtained and shown in FIGS. 11A and 11B when a long period of time up to 700 hr. The measured data by the FBG-based effective stress cell are in good agreement with the calculated values for the whole loading period. Accordingly, this newly developed FBG-based effective stress cell which can measure the effective stress in a single cell and is placed at one location can provide better and more reliable measurement of the effective stress in a saturated soil than that using the indirect measurement method using two cells at two different locations.

By comparison with the calculated effective stress values from the measured total earth pressure and pore-water pressure provided by conventional transducers, the FBG-based effective stress cell is verified to have good accuracy for direct measurement of the effective stress in a saturated soil with high reliability.

Thus, it can be seen that an improved effective stress cell has been disclosed which eliminates or at least diminishes the disadvantages and problems associated with prior art processes and devices. The porous diaphragm of the effective stress cell in accordance with certain embodiments allows pore-water to enter the interior space between the sensing diaphragm and the porous diaphragm to provide complete balance of pore-water pressures in the front and back of the sensing diaphragm. Thus, the effective stress cell is capable of direct measurement of effective stress in saturated soils by using one diaphragm only as well as at one location rather two locations using at least two conventional transducers.

The effective stress cell described herein can be used, but no limited to, for: monitoring effective stress of important foundations during and after construction period, which can help to control the displacement of foundations; monitoring effective stress of slopes, which can help to evaluate the stability of slopes and provide an early warning for landslides, debris flows, etc.; or monitoring effective stress of retaining walls or other structures in contact with soils, which can help to evaluate the deformation and stability of these retaining walls and structures.

Although the invention has been described in terms of certain embodiments, other embodiments apparent to those of ordinary skill in the art are also within the scope of this invention. Accordingly, the scope of the invention is intended to be defined only by the claims which follow.

What is claimed is:

1. An effective stress cell for measuring effective stress in saturated soil comprising:
    a sensing diaphragm comprising an outer surface and an inner surface, the outer surface for being subjected to total stress from soil particles and pore-water above the sensing diaphragm, the inner surface being opposite to the outer surface;

a porous diaphragm preventing soil particles below the porous diaphragm from passing through the porous diaphragm and comprising a plurality of pores for allowing pore-water below the porous diaphragm to pass through the porous diaphragm, or an impermeable stainless-steel disk and a rigid ring sealed by an O ring so no water enters into the effective stress cell during calibration of the effective stress cell;

a connector connecting the sensing diaphragm and the porous diaphragm in a way that an interior space surrounded by the inner surface of the sensing diaphragm, the porous diaphragm and the connector is formed;

a first strain sensor attached to the inner surface for measuring strain change on the sensing diaphragm under deflection of the sensing diaphragm due to all vertical fractions of particle contact forces only exerted on the outer surface thereof; and a second strain sensor disposed within the interior space of the effective stress cell for temperature compensation to the measured strain change by the first strain sensor;

wherein the plurality of pores allows the pore-water below the porous diaphragm to enter the interior space for filling the interior space with the pore-water to balance pore-water pressures on the outer surface and the inner surface such that the deflection of the sensing diaphragm is only caused by the effective stress such that the effective stress is directly determined by the measured strain change without measuring pore-water pressure in the saturated soil, and wherein the first and second strain sensors are both fiber Bragg grating sensors.

2. The effective stress cell of claim 1, wherein the effective stress cell is cylindrical and has a diameter between 3 cm and 20 cm and a thickness between 10 mm and 20 mm.

3. The effective stress cell of claim 1, wherein the outer surface of the sensing diaphragm is for contacting the soil particles and the pore-water above the sensing diaphragm.

4. The effective stress cell of claim 1, wherein the sensing diaphragm has an elastic modulus between 193 GPa and 206 GPa, a Poisson's ratio between 0.24 and 0.3, and a yield strain between 0.001 and 0.0015.

5. The effective stress cell of claim 1, wherein the interior space is cylindrical and has a thickness between 8 mm and 18 mm.

6. The effective stress cell of claim 1, wherein the plurality of pores has a pore arrangement density between 2 pores/cm$^2$ and 5 pores/cm$^2$, each pore is cylindrical and has a diameter between 0.2 mm and 1 mm.

7. The effective stress cell of claim 1, wherein the plurality of pores is evenly distributed in the porous diaphragm.

8. The effective stress cell of claim 1, wherein the connector is a rigid ring.

9. The effective stress cell of claim 1, wherein each of the sensing diaphragm, the porous diaphragm and the connector comprises steel.

10. The effective stress cell of claim 1, wherein the strain sensor is attached on a center of the inner surface of the sensing diaphragm.

11. The effective stress cell of claim 1 further comprising:
a protection cover located above the sensing diaphragm in a way that an enclosed space is formed between the protection cover and the sensing diaphragm, wherein a top surface of the protection cover is for contacting the soil particles and the pore-water above the protection cover; and an incompressible fluid filling the enclosed space for transmitting the total stress from the soil particles and the pore-water on the protection cover to the outer surface of the sensing diaphragm.

12. The effective stress cell of claim 11, wherein the connector further connects the protection cover.

13. The effective stress cell of claim 11, wherein the incompressible fluid is mercury, de-aired water, or de-aired oil.

14. A system for measuring effective stress in saturated soil comprising:
the effective stress cell of claim 1; and
a strain measurement apparatus connecting the first and second strain sensors via a signal line for measuring the strain change on the sensing diaphragm.

15. The system of claim 14 further comprising a processor for determining the effective stress based on the measured strain change.

16. The system of claim 14, wherein the strain measurement apparatus is an optical sensing interrogator.

17. The system of claim 15, wherein the sensing diaphragm is a circular plate, the first strain sensor is attached on a center of the inner surface, the processor is configured to calculate the effective stress σ' with the following equation:

$$\sigma' = \frac{32D}{C_\varepsilon h a^2 \lambda_{B0}} \Delta \lambda_B$$

where $\lambda_{B0}$ a Bragg wavelength of the first strain sensor at an initial state, $\Delta\lambda_B$ is a wavelength shift induced by strain change $\Delta\varepsilon$, $C_\varepsilon$ is a coefficient of the first strain sensor corresponding to strain, D is bending stiffness of the circular plate, h is a thickness of the circular plate and α is a radius of the circular plate.

18. A method for measuring effective stress in saturated soil comprising:
locating the effective stress cell of claim 1 in saturated soil, wherein the sensing diaphragm faces upward and the porous diaphragm faces downward;

allowing pore-water below the porous diaphragm to enter the interior space through the plurality of pores for filling the interior space with the pore-water to balance pore-water pressures on the outer surface and the inner surface of the sensing diaphragm;

measuring strain change on the sensing diaphragm under deflection of the sensing diaphragm caused by effective stress in saturated soil; and determining the effective stress based on the measured strain change, wherein the measured strain change by the first strain sensor is compensated by temperature variation measured by the second strain sensor as the Bragg wavelength of the fiber Bragg grating sensor changes linearly with the strain change and temperature variation.

* * * * *